United States Patent [19]

Takagi et al.

[11] Patent Number: 5,202,876
[45] Date of Patent: Apr. 13, 1993

[54] OPTICAL DISC RECORDING-REPRODUCING APPARATUS IN WHICH SECTOR SUBSTITUTION OF DEFECTIVE SECTORS IS PERFORMED

[75] Inventors: Yuji Takagi, Hirakata; Isao Satoh, Neyagawa; Yoshihisa Fukushima, Osaka; Yasushi Azumatani, Neyagawa; Hiroshi Hamasaka, Nishinomiya, all of Japan

[73] Assignee: Matsushita Electric Industrial Co., Ltd., Kadoma, Japan

[21] Appl. No.: 699,616

[22] Filed: May 15, 1991

[30] Foreign Application Priority Data

May 17, 1990 [JP] Japan .................................. 2-127155

[51] Int. Cl.⁵ ...................... G11B 7/00; G11B 27/36; G11B 5/09
[52] U.S. Cl. ..................................... 369/58; 369/54; 360/53; 371/30
[58] Field of Search .................. 369/48, 54, 58, 47, 369/59; 360/53, 48, 31; 371/37.7, 37.1, 38.1, 30, 31, 21.6

[56] References Cited

U.S. PATENT DOCUMENTS

| | | | |
|---|---|---|---|
| 4,821,254 | 4/1989 | Sathod et al. | 369/54 |
| 4,833,663 | 5/1989 | Satoh et al. | 369/54 |
| 4,835,757 | 5/1989 | Abiko | 369/48 |
| 4,849,956 | 7/1989 | Aizawa | 369/58 |
| 4,949,326 | 8/1990 | Takagi et al. | 369/54 |
| 4,984,230 | 1/1991 | Satoh et al. | 369/54 |
| 5,005,165 | 4/1991 | Yamanaka et al. | 369/58 |
| 5,132,956 | 7/1992 | Ichikawa | 369/54 |

OTHER PUBLICATIONS

Optical Dic Standard, JTC1/SC23 N292, Oct. 25, 1989, pp. 1-103.

Primary Examiner—Andrew L. Sniezek
Assistant Examiner—Thang V. Tran
Attorney, Agent, or Firm—Cushman, Darby & Cushman

[57] ABSTRACT

In a plurality of sectors in a track of an optical disc, when defect sectors having defect are a lesser number than a predetermined number, a substitution sector in a first substitution area of the optical disc is substituted for the defect sector, and when the number of the defect sector is the predetermined number or more, the sectors of a substitution track in a second substitution area is substituted for entire sectors in the track, then a map data including the address of the track and the address of the substitution track are recorded in a map sector of a map sector area.

6 Claims, 7 Drawing Sheets

FIG.3(a) Track n

FIG.3(b) Track m

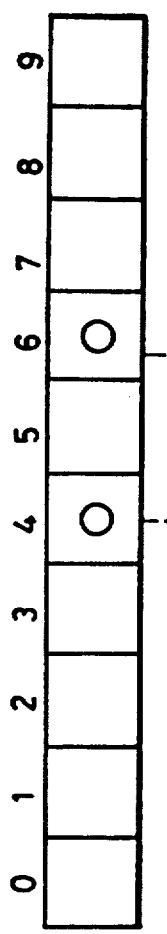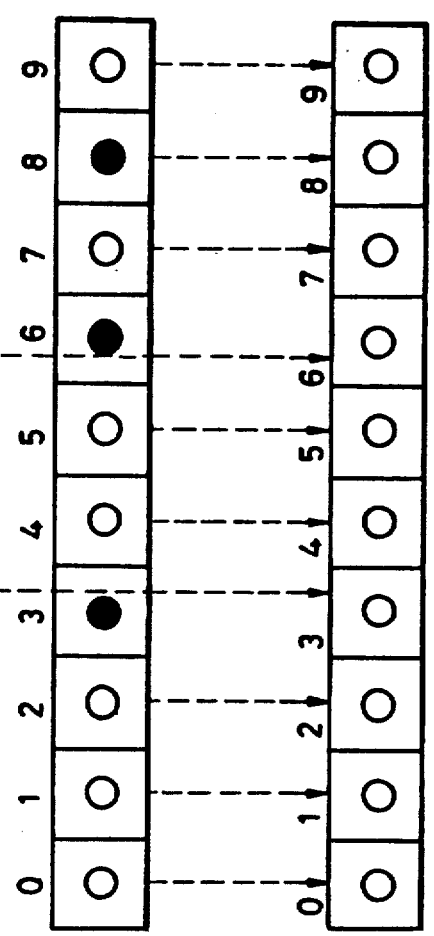
FIG.4(a) Track n
FIG.4(b) Track m
FIG.4(c) Sbstitution track P Map sector Second map sector ID# OPTICAL DISC RECORDING-REPRODUCING APPARATUS IN WHICH SECTOR SUBSTITUTION OF DEFECTIVE SECTORS IS PERFORMED

FIELD OF THE INVENTION AND RELATED ART STATEMENT

1. Field of the Invention

The present invention relates generally to an optical disc recording-reproducing apparatus, and more particularly to an optical disc recording-reproducing apparatus in which sector substitution operation is performed in the event that a sector of the optical disc is determined to have a defect.

2. Description of the Related Art

A recording area of an optical disc is divided into a plurality of sectors, and recording operation and reproducing operation of data are performed in units of one sector. Sectors for recording data are called a "user sector". In these user sectors, a sector having a defect is called a "defect sector". The defect sector is not capable of recording or reproducing data.

In general, the optical disc has some defect sectors in which data is not correctly recorded or from which recorded data is not correctly reproduced. The defect is caused by dust adhered on the surface of the optical disc or scratches on the surface of the substrate of the optical disc. When a sector is determined to be a defect sector, the data to be recorded in the defect sector is recorded in another sector which substitutes for the defect sector and hence is called a "substitution sector". The substitution sector is arranged in a "substitution area" allocated on a predetermined area of the recording area of the optical disc. The substitution of the defect sector is called a "substitution operation, and after the substitution operation, recording or reproducing of the data is performed in the substitution sector.

An example of the substitution operation is described in the "Optical Disc Standard JTC1/SC23 N292", Oct. 25, 1989, page 58–64. According to the Standard, when data are recorded in a user sector and the data recorded in the user sector are reproduced therefrom, if the number of error data exceeds a predetermined number, the user sector is determined to be a defect sector. Thereafter, the data to be recorded in the defect sector is recorded in a substitution sector in the substitution sector area. Moreover, the map information which associates the defect sector with the substitution sector is recorded in a map sector of a map sector area allocated in a predetermined part of the recording area. In reproducing data recorded in the substitution sector, first the map sector is searched, and the occurrence of a substitution operation is detected. When a substitution operation has been performed, the address of the substitution sector is detected, and the recording or reproducing operation of data is accomplished in the substitution sector.

During operation of the optical disc recording-reproducing apparatus, dust is liable to adhere on the surface of the optical disc or the surface thereof is liable to be scratched with fingers during handling, such as when inserting the optical disc into the optical disc recording-reproducing apparatus or to extract it therefrom. Therefore, a worn-out optical disc generally has many defect sectors. In the worn-out optical disc, there are numerous occasions where the density of the defect sectors in the recording area of the optical disc partially increases. In the event that a large number of data occupying a plurality of sectors are recorded or reproduced in the optical disc having many such defect sectors, the optical head of the optical disc recording-reproducing apparatus must be frequently moved between the user sector area and the substitution sector area. The optical head takes several tins of milliseconds on an average to search one sector. Consequently, in the event that there are many defect sectors in the user sector area, and the optical head is forced to move frequently between the user sector area and the substitution sector area, an exceptional amount of time is required to search sectors in the user sector area and the substitution sector area. And hence a "throughput" of the optical disc recording-reproducing apparatus is significantly decreased.

OBJECT AND SUMMARY OF THE INVENTION

An object of the present invention is to provide an optical disc recording-reproducing apparatus having a high throughput in recording or reproducing information in an optical disc having a plurality of defect sectors.

The optical disc recording-reproducing apparatus for use with an optical disc having a data area, first and second substitution areas respectively containing substitution sectors, and a map sector area containing map sectors in accordance with the present invention comprises:

optical head means for recording data in a predetermined sector of a track of the optical disc or for reproducing data recorded in the sector of the track by applying a light beam having a predetermined intensity to the sector, a MODEM circuit for modulating data to be recorded in the sector or for demodulating the data reproduced from the sector, error detecting means for determining whether the sector of the optical disc is a defect sector, the defect sector being the sector of the optical disc found by the error detecting means to have having an error based on the data to be recorded in the sector or data reproduced from the sector, and a CPU for performing a substitution operation for substituting a substitution sector from the first substitution area of the optical disc for the defect sector in the event that the number of the defect sectors detected by the error detecting means out of a predetermined number of sectors is less than a given predetermined number, and for substituting the substitution sectors of said second substitution area of the optical disc for all of sectors of the predetermined number of sectors including the defect sectors in the event that the number of the defect sectors is greater than or equal to the given predetermined number, and for recording addresses of the defect sectors and the substitution sectors in the map sector area of the optical disc.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3(a) is a chart of the sector arrangement in a track "n" of the optical disc;

FIG. 3(b) is a chart of the sector arrangement in a track "m" of the optical disc;

FIG. 4(a) is a chart of sector arrangement in the track "n";

FIG. 4(b) is a chart of sector arrangement in the track "m";

FIG. 4(c) is a chart of sector arrangement in a substitution track "p";

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
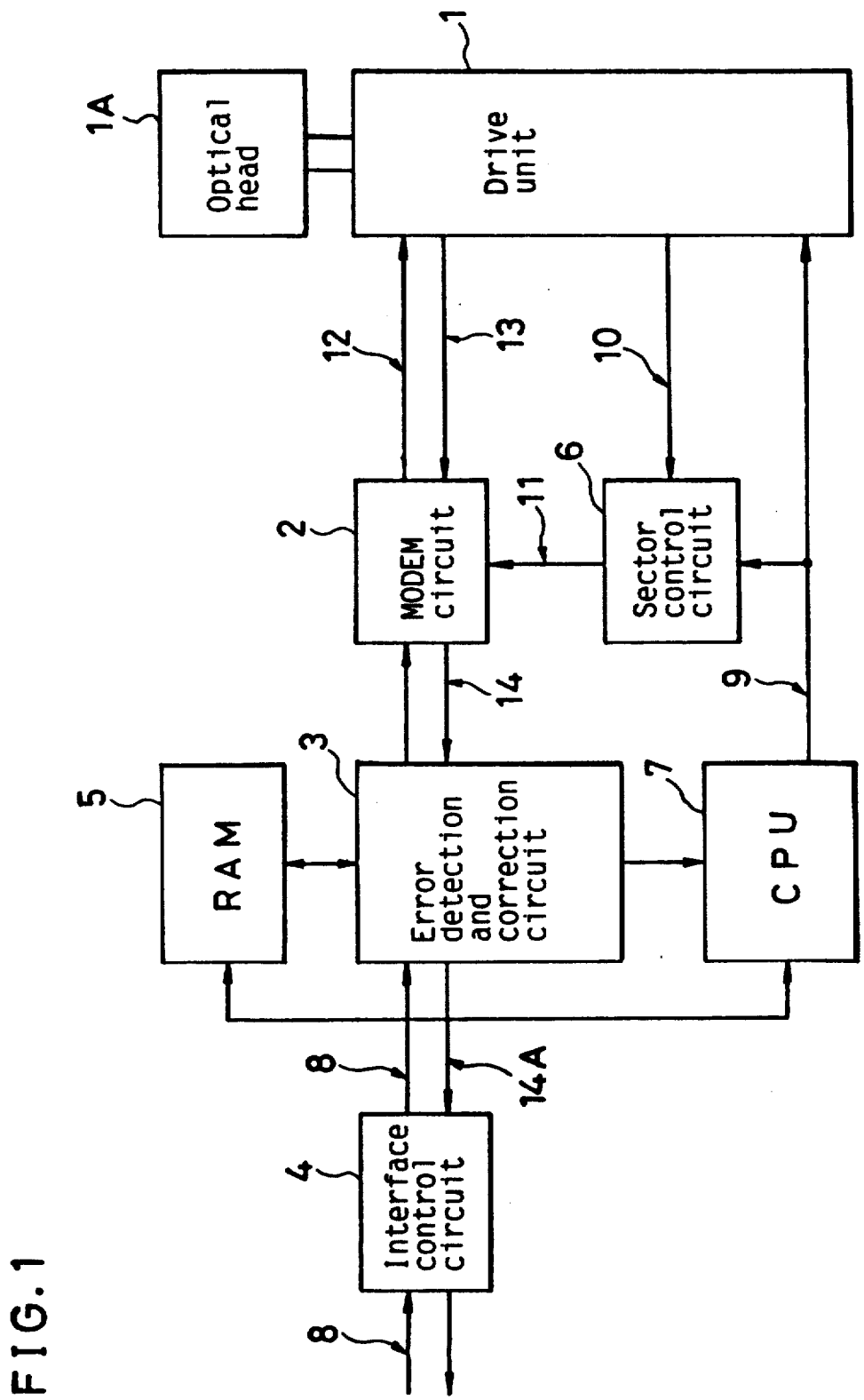
FIG. 1 is a block diagram of an embodiment of the optical disc recording-reproducing apparatus of the present invention.

FIG. 1 is a block diagram of an embodiment of the optical disc recording-reproducing apparatus of the present invention. Referring to FIG. 1, a drive unit 1 comprises a revolution apparatus for rotating an optical disc (not shown) and an accessing means for accessing an optical head 1A to a predetermined track of the optical disc. The optical head 1A emits a laser beam to a recording area of the optical disc and receives a reflected laser light from the recording area thereof in a manner that is well known in the art.

A MODEM circuit 2 modulates data to be recorded in the optical disc and outputs a digitalized recording signal 12, and demodulates a reproduced signal 13 reproduced from the optical disc, and outputs demodulated data 14.

In an error detection and correction circuit 3, data 8 inputted from a host computer located outward from the optical disc recording-reproducing apparatus is applied to the error detection and correction circuit 3 through an interface control circuit 4 and is coded to detect error and correct it. The demodulated data 14 is applied to the error detection and correction circuit 3 from the MODEM circuit 2, and the error in the demodulated data 14 is detected and corrected thereby.

RAM 5 serves as a buffer and a memory of data. A sector control circuit 6 serves as a timing controller for recording and reproducing data. The entire operation of the optical disc recording-reproducing apparatus is controlled by a CPU 7.

The recording operation of data sent from the host computer is elucidated hereafter. The data sent from the host computer is inputted to the error detection and correction circuit 3 through the interface control circuit 4, and is coded for detecting and correcting an error. The coded data is temporarily stored in the RAM 5.

The coded data is applied to the CPU 7 from the error detection and correction circuit 3, and the address of a target sector is selected to record the input data. Then a target sector address data 9 is output from the CPU 7 to designate the target sector. The target sector address data 9 is applied to the sector control circuit 6 and the drive unit 1. In the drive unit 1 and optical head 1A, the target sector is sought on the basis of the target sector address data 9, and the optical head 1A is moved on the target sector. Then, a sector address, which is recorded in the head part of each sector in advance, is reproduced, and a sector address data 10 is output from the drive unit 1 and is applied to the sector control circuit 6.

In the sector control circuit 6, the sector address data 10 is compared with the target sector address data 9, and when both the address data are in coincidence with each other, a starting signal 11 is output from the sector control circuit 6 and is supplied to the MODEM circuit 2, and thereby The MODEM circuit 2 is activated by the starting signal 11. Then the data stored in the RAM 5 is inputted to the error detection and correction circuit 3 in which a code for detecting and correcting an error is attached to the data, and the data attached with the code is inputted to the MODEM circuit 2. A recording signal 12 is generated in the MODEM circuit 2 on the basis of the data, and is applied to the drive unit 11. The recording signal 12 is recorded in the target sector with the optical head 1A.

In reproduction operation of the data, a target sector address data 9 representing the address of a target sector to be reproduced is inputted to the sector control circuit 6 and the drive unit 1 from the CPU 7. Then, the target sector is sought by the drive unit 1, and the optical head 1A is positioned on the track having the target sector. Subsequently, the address recorded on the head part of the target sector is reproduced, and a sector address data 10 is output to the sector control circuit 6.

In the sector control circuit 6, the sector address data 10 is compared with the target sector address data 9, and when both the address data are in coincidence with each other, a starting signal 11 is sent from the sector control circuit 6 to the MODEM circuit 2. Consequently, data to be reproduced, which is recorded in the target sector, is reproduced and is inputted to the MODEM circuit 2.

In the MODEM circuit 2, a reproduced signal 13 of the data to be reproduced is demodulated, and the demodulated data 14 is inputted to the error detection and correction circuit 3, in which error correction operation is performed by utilizing the RAM 5 as and operation buffer. The reproduced data 14A of which the error correction operation has been performed is transmitted to the host computer via the interface control circuit 4.

Figure 2:
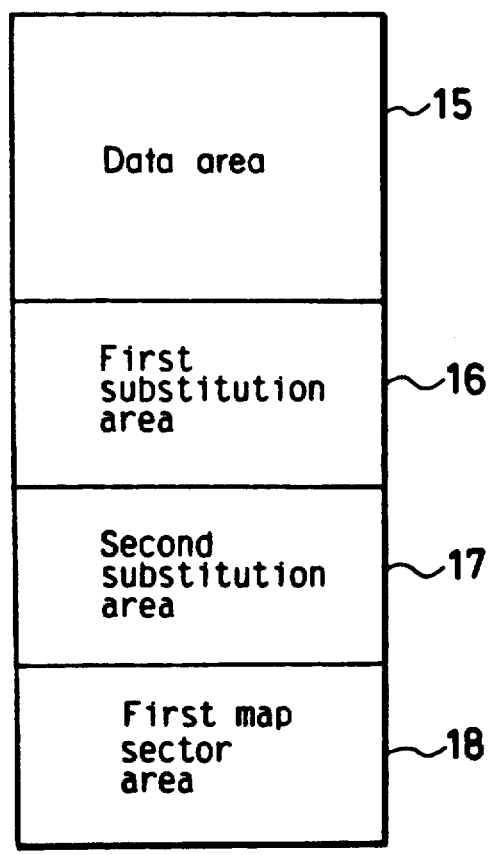
FIG. 2 is a chart of a first example of recording area allocation of the optical disc in the embodiment.

FIG. 2 is a chart of a first example of recording area allocation of the optical disc in accordance with the first embodiment of the present invention. Referring to FIG. 2, the recording area of the optical disc is divided into a data area 15, a first and a second substitution sector areas 16 and 17 both comprising substitution sectors to substitute for the defect sectors of the data area 15, and a first map sector area 18 having the address of the defect sectors and the address of the substitution sectors. The first substitution area 16 has the substitution sectors to substitute for the defect sectors in the event that the number of defect sector is less than a predetermined number (three, for example) in one track. On the other hand, the second substitution area 17 has the substitution sectors to substitute for the entire data of a track in the event that the defect sectors in one track is the predetermined number or more.

Figure 3C:
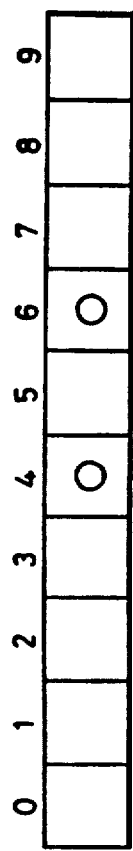
FIG. 3(c) is a chart of a map sector arrangement.
Figure 3C:
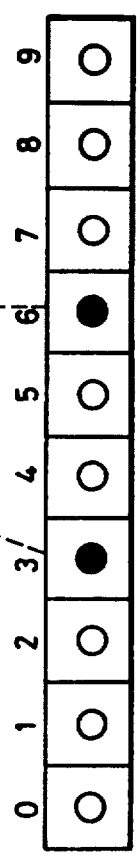
Figure 3C:
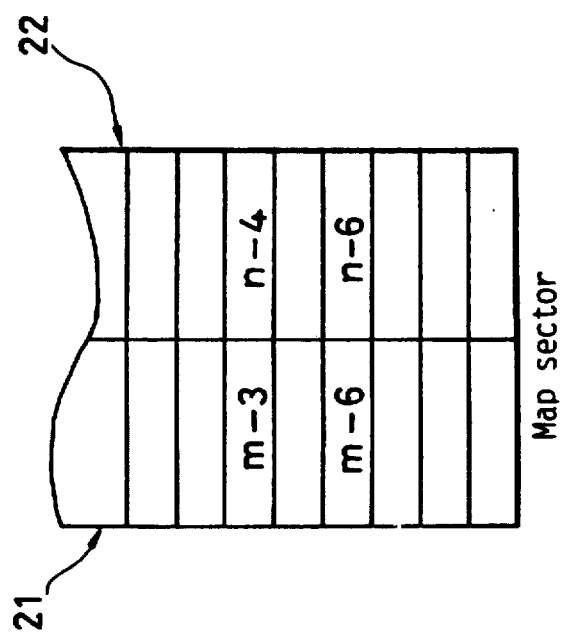

FIG. 3(a) is a chart of substitution sector allocation of a track "n" in the first substitution area 16, and FIG. 3(b) is a chart of a user sector allocation of a track "m"

in the data area 15. Moreover, FIG. 3(c) is a chart of address allocation of a map sector in the map sector area 18. The substitution operation is elucidated in detail by utilizing FIGS. 3(a), 3(b) and 3(c) hereafter.

Referring to FIG. 3(a), a plurality of sectors 0, 1, 2 ... 8 and 9 are the substitution sectors of the track "n" belonging in the first substitution area 16. Referring to FIG. 3(b), a plurality of sectors 0, 1, 2 ... 8 and 9 are the user sectors of the track "m" belonging in the data area 15. In each sector illustrated in FIGS. 3(a) and 3(b), a white circle "○" represents data recorded in the sector, and a black spot "●" represents a defect in a sector. Substitution sectors 4 and 6 of the track "n" substitute for user sectors 3 and 6 of the track "m", respectively, if the user sectors 3 and 6 of the track "m" are defect sectors. Hereinafter the user sectors 3 and 6 are called defect sectors 3 and 6. Referring to FIG. 3(c), the chart represents the address structure in a map sector. In the map sector, a defect sector address (m-3) of the defect sector 3 is recorded in a defect sector address list 21 of the left column of the chart, and the address (n-4) of the substitution sector 4 is recorded in the position corresponding to the defect sector address (m-3) in the substitution sector address list 22 of the right column of the chart. The data recorded in the map sector is called "map information". A defect sector address (m-6) and a substitution sector address (n-6) are also recorded in the map sector in a manner similar to that described above.

In recording data to the optical disc on which the substitution operation has been performed, first, a map sector in the map sector area 18 is reproduced, and the map information of the data in the map sector is stored in the RAM 5. Subsequently, the address of a target sector to record the data is searched in the defect sector address list 21. In the event that the address of the target sector is present in the defect sector address list 21, the address of the target sector is changed to the substitution sector address in the substitution sector address list 22 which corresponds to the defect sector address. Consequently, the data to be recorded is safely recorded in the sector having no defect.

Detection of the defect sector in the optical disc is performed by the known "read verify process". According to the read verify process, data is recorded in a sector of the data area of the optical disc, and the data recorded in the sector is immediately reproduced. Then, the number of errors in the data is counted, and when the number of error is more than a predetermined reference value, the sector is determined to be a defect sector. The predetermined reference value is represented by the number of error symbols per one code-word, for example. Detection and correction of error is performed by known "Reed Solomon code". In the detection and correction of error by the Reed Solomon code, first, the number of error symbols are calculated, subsequently, the positions of the error symbols in the code-word are determined, and then the error is corrected. Therefore, the number of error symbols per code-word can be calculated in the error detection and correction operation.

Referring to FIG. 3(b), two user sectors 3 and 6 in the ten user sectors 0, 1, 2 ... 8 and 9 of the track "m" are defect sectors. When another defect sector is detected in the track "m" the substitution operation is performed as described hereafter in reference with FIGS. 4(a), 4(b), 4(c) and 4(d).

Referring to FIGS. 4(a) and 4(b), since the user sectors 3 and 6 in the track "m" are the defect sectors, the substitution sectors 4 and 6 in the track "n" of the first substitution area 16 are substituted for the user sectors 3 and 6 in the above-mentioned operation. FIG. 4(c) is a chart of substitution sectors 0, 1, 2 ... 8 and 9 in a track "p" of a second substitution area 17. If a user sector 8 in the track "m" happens to become a defect sector after the above-mentioned operation, three sectors of the ten sectors in the track "m" are defect sectors. In such an example, when the ratio of defect sectors to the user sectors in one track "m" exceeds a predetermined value (30% in the example shown by FIG. 4(b)), the substitution sectors of the substitution track "p" (FIG. 4(c)) belonging to the second substitution area 17 substitute for entire sectors 0, 1 ... 8, 9 of the track "m". Consequently, the data recorded in the substitution sectors 4 and 6 in the track "n" of the first substitution area 16 are transferred to the substitution sectors 3 and 6 in the track "p", respectively.

Figure 4D:
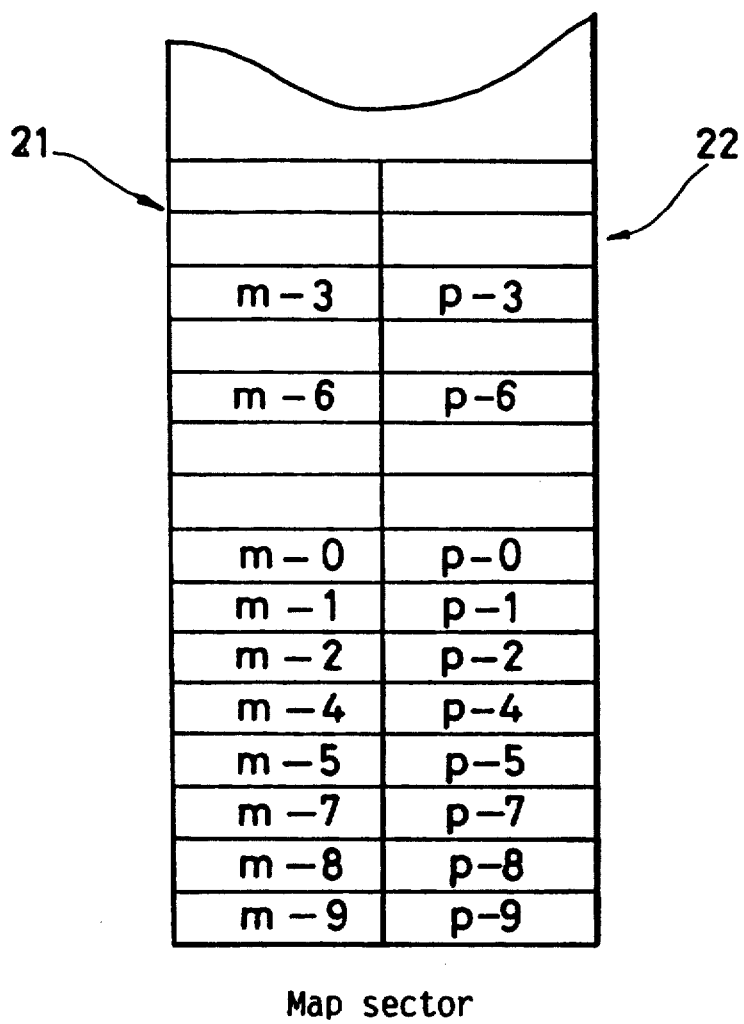
FIG. 4(d) is a chart of the map sector arrangement.

In the map information of the first map sector area 18, the substitution sector addresses (n-4) and (n-6) corresponding to the defect sector addresses (m-3) and (m-6) of the defect sector address list 21, respectively, as shown in FIG. 3(c), are changed to substitution sector addresses (p-3) and (p-6), respectively, as shown by FIG. 4(d). Simultaneously, the addresses (m-0), (m-1), (m-2), (m-4), (m-5), (m-7), (m-8) and (m-9) of the user sectors 0, 1, 2, 4, 5, 7, 8 and 9 in the track "m" are recorded in the defect sector address list 21, and the substitution sector addresses (p-0), (p-1), (p-2), (p-4), (p-5), (p-7), (p-8) and (p-9) in the substitution track "p" are recorded in the addresses corresponding to the above-mentioned user sectors 0, 1, 2, 4, 5, 7, 8 and 9 of the substitution address list 22. The above-mentioned "track substitution operation" is performed by the CPU 7.

Figure 5:
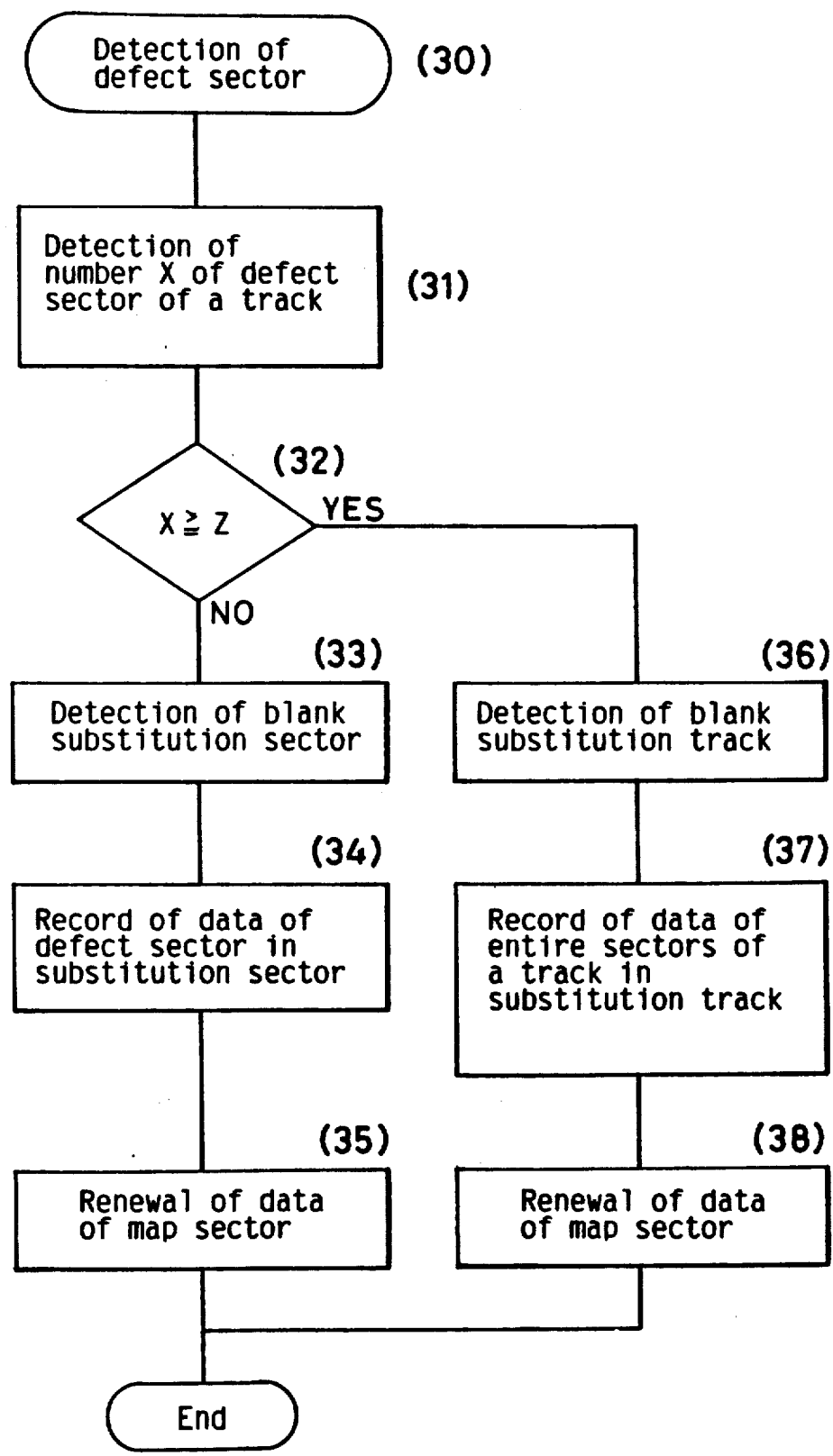
FIG. 5 is a flow chart of operation of the present invention.

FIG. 5 is a flow chart of the above-mentioned substitution operation. In Step 30, when a defect sector in a track has been newly detected, the number X of defect sectors in the entire sectors of the track is counted based on the map information of the first map sector area 18 (Step 31). The map information has the data of the number of address of the defect sector, for example.

The number X of the defect sector is compared with a predetermined member Z (three, for example) (Step 32).

When the number X of defect sector in a track is less than the predetermined number Z, a substitution sector having no recorded data is detected (Step 33). Subsequently, the data of the above-mentioned defect sector is recorded in the substitution sector having no recorded data (Step 34), and the addresses of the defect sector and substitution sector are added to the map information of a map sector, and thereby the map information is renewed (Step 35).

On the other hand, when the number X of defect sector is the predetermined number Z or more, a substitution track having no sector recorded data therein is searched (Step 36), and the data of entire sectors of the track are recorded in the sectors of the substitution track (Step 37). Then, the addresses of entire sectors of the track and the substitution sector addresses of the substitution track are recorded in the map sector, and thereby the data of the map information are renewed (Step 38).

As mentioned above, according to the embodiment, when a predetermined number of defect sector appears in a track, use of the track is quit, and the data of entire sectors of the track are transferred to the substitution track having no defect sectors. Consequently, the optical head need not move frequently between the defect sectors and the substitution sectors, and thus, the loss of time is eliminated, and the "throughput" of the optical disc recording-reproducing apparatus is improved.

Figure 6:
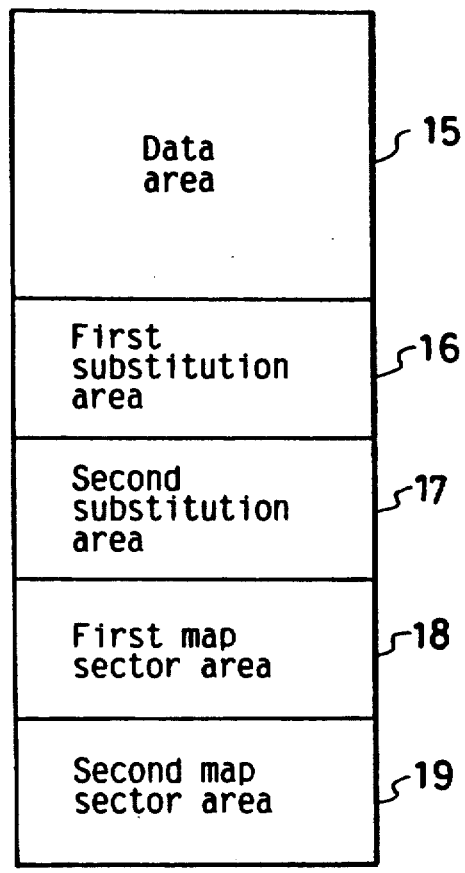
FIG. 6 is a chart according to recording area allocation of a second embodiment of the present invention.

In the above-mentioned first embodiment of the present invention, the recording area comprises only one map sector area 18. In a second embodiment of the present invention which is described hereafter, a second map sector area 19 is included in the recording area in addition to the first map sector area 19. FIG. 6 is a chart of allocation of the recording area in the second example. Referring to FIG. 6, the recording area of an optical disc is divided into the data area 15, the first substitution area 16, the second substitution area 17, the first map sector area 18 and the second map sector area 19. The operation of the data area 15, first substitution area 16, second substitution area 17 and first map sector area 18 is identical with that of the first embodiment.

Figure 7:
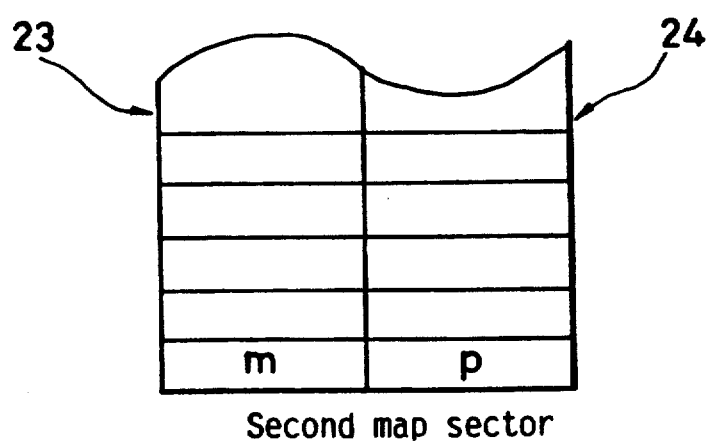
FIG. 7 is a chart of the sector arrangement in a second map sector of a second map sector area.

FIG. 7 is a chart of an address allocation having a defect track address list 23 and a substitution track address list 24 in the map sector of the second map sector area 19. Referring to FIG. 7, an address "m" of a track having the number of Z or more of defect sectors (hereinafter is referred to as "defect track") is recorded in the defect track address list 23, and the address of a substitution track is recorded in the substitution track address list 24. Map information of "track substitution operation" with respect to a defect track is recorded in the second map sector area 19. Therefore, in the second example, the substitution operation of the defect track is performed with respect to one track, and hence a substitution sector address can be rapidly detected by seeking the track. consequently, the throughout of the optical disc recording-reproducing apparatus is further improved.

In the first and second examples of the embodiment described above, the track substitution operation of a track is performed when the number of defect sectors in one track is the predetermined value Z or more. In another application, for example, the track substitution operation can be performed when the number of defect sectors in a predetermined number of tracks, such as two or three tracks, becomes the predetermined number Z or more. Moreover, the track substitution operation can be performed on a group of arbitrary sectors or on a group of arbitrary tracks.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical disc recording-reproducing apparatus for use with an optical disc having a data area, first and second substitution areas respectively containing substitution sectors, and a map sector area containing map sectors, said apparatus comprising:

optical head means for recording data in a predetermined sector of a track of said optical disc or for reproducing data recorded in said sector of said track by applying a light beam having a predetermined intensity to said sector, a MODEM circuit for modulating data to be recorded in said sector or for demodulating said data reproduced from said sector, error detecting means for determining whether said sector of said optical disc is a defect sector, said defect sector being a sector of said optical disc found by said error detecting means to have an error based on the data to be recorded in said sector or data reproduced from said sector, and a CPU for performing a substitution operation for substituting a substitution sector from said first substitution area of said optical disc for said defect sector in the event that the number of said defect sectors detected by said error detecting means out of a predetermined number of sectors is less than a given predetermined number, for substituting said substitution sectors of said second substitution area of said optical disc for all the sectors of said predetermined number of sectors including said defect sectors in the event that the number of said defect sectors is greater than or equal to said given predetermined number, and for recording addresses of said defect sectors and said substitution sectors in said map sector area of said optical disc.

2. An optical disc recording-reproducing apparatus in accordance with claim 1, wherein said predetermined number of sectors are sectors of one track.

3. An optical disc recording-reproducing apparatus in accordance with claim 1, wherein said CPU further records data of said defect sector to said substitution sector, and renews the data of said map sector in said map sector area in which addresses of said defect sectors and substitution sectors are recorded.

4. An optical disc recording-reproducing apparatus in accordance with claim 1, wherein the number of said defect sectors is obtained by counting the number of addresses of said defect sectors recorded in said map sector.

5. An optical disc recording-reproducing apparatus in accordance with claim 2, wherein data of the entire sectors of said one track are recorded in said substitution sectors of said second substitution area, and said data of said map sector are renewed during said substitution operation.

6. An optical disc recording-reproducing apparatus for use with said optical disc which includes a second map sector area containing map sectors, said apparatus being in accordance with claim 1, wherein said CPU further renews data of a said map sector in said second map sector area, said data of said map sector of said second map sector area including a track address of a track in which the number of defect sectors is equal to or greater than said predetermined number and the track address of a substitution track which is substituting for said track having a number of defect sectors greater than or equal to said predetermined number.

* * * * *